(No Model.)

D. A. JOHNSON.
NUT LOCK.

No. 344,380.      Patented June 29, 1886.

WITNESSES:
James A. Woodbury
Walter S. Perry

INVENTOR
Daniel Alley Johnson.
BY
E. Frank Woodbury.
ATTORNEY

N. PETERS, Photo-Lithographer, Washington, D. C.

UNITED STATES PATENT OFFICE.

DANIEL ALLEY JOHNSON, OF BOSTON, MASSACHUSETTS.

NUT-LOCK.

SPECIFICATION forming part of Letters Patent No. 344,380, dated June 29, 1886.

Application filed February 11, 1886. Serial No. 191,647. (No model.)

*To all whom it may concern:*

Be it known that I, DANIEL ALLEY JOHNSON, of Boston, in the county of Suffolk and State of Massachusetts, have invented certain new and useful Improvements in Nut-Locks, of which the following, taken in connection with the accompanying drawings, is a specification.

The object of my invention is to produce a nut-lock of any known suitable material that will be scientifically and mechanically correct in its construction and action, of great comparative strength and durability, and that can be cheaply manufactured.

My invention is of a nature that relates to nut-locks designed for general use.

The nut-lock may be made of single or varying thickness, of circular, rectangular, or angular form or style.

The nut-lock that I shall describe in this specification and show in the accompanying drawings will be one of steel, threefold, varying thickness, circular in form, and one that is designed for use as a nut-lock upon nuts of bolts used in connection with fish-plates for railroad-rails.

Figure 1:
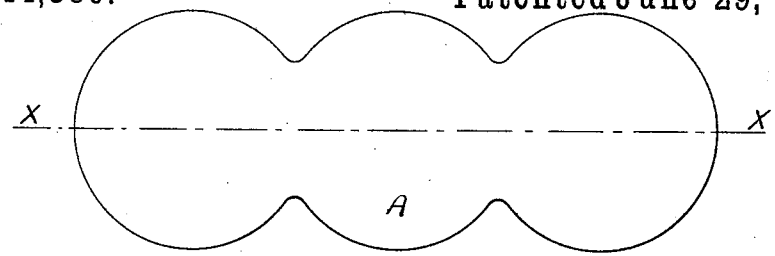
Figure 2:
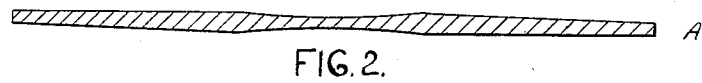
Figure 3:
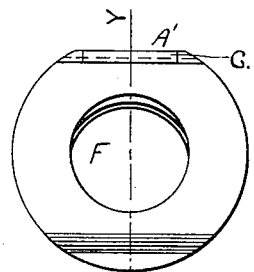
Figure 4:
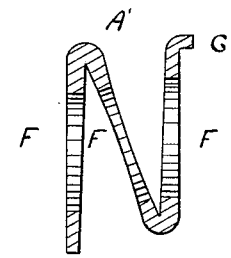
Figure 5:
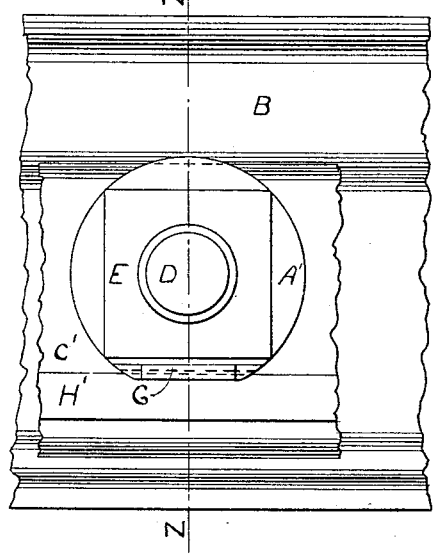

Figure 1 represents in plan the nut-lock before it is folded, and Fig. 2 is a section of same on line X X. Fig. 3 represents in front elevation the nut-lock after being folded and made ready for use, and Fig. 4 is a section of same on line Y Y. Fig. 5 shows in elevation a portion of a railroad-rail, fish-plates, and one fish-plate bolt and nut with the nut-lock in use, and Fig. 6 is a section of same on line Z Z.

The blank A, Fig. 1, represents a drop-forging made to dimensions in the usual manner, and having a cross-section of varying thickness, as shown in Fig. 2. The blank A is then folded so as to make three leaves or folds, as shown in Figs. 3 and 4. The spring-washer thus made is compressed, and the holes F are punched to a diameter somewhat larger than that of the bolt over which it is to be used, its outside circular edges are trimmed to dimensions required, and the lip G is struck up or folded and cut to the shape shown. Then the spring-washer, after being tempered, if necessary, is ready for use as a nut-lock.

Figure 6:
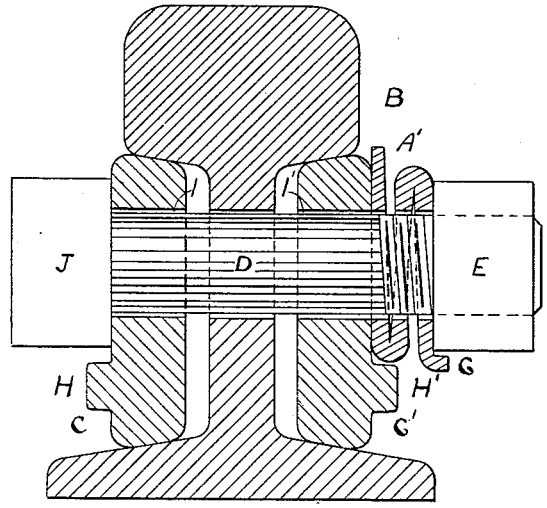

The rail B, Figs. 5 and 6, has upon each side, respectively, the fish-plates C and C', which are used in fishing the adjacent ends of rails, in the usual manner. The bolt D, passing through the fish-plate C, the rail B, the fish-plate C', the nut-lock A', and the nut E are made in the usual manner, and for the purposes hereinafter described.

The fish-plates C and C' have rolled upon their faces the ledges H and H', respectively, as shown. The ledge H on the fish-plate C is rolled at such a distance from the center of the hole I and at such a height that the head J of the bolt D cannot turn to any detrimental extent. The fish-plates C and C' being located in their proper position, the bolt D is passed through them and the rail B. Then the nut-lock A' is placed on the bolt D in the position shown, the ledge H' on the fish-plate C' performing the same duty toward the nut-lock A' as the ledge H on the fish-plate C toward the head J of the bolt D. The nut E is then screwed on the bolt D against the nut-lock A' until the desired tension is reached.

When the bolt D is made up as shown, it will be seen that the nut E cannot screw back without tightening itself; therefore the nut is securely locked. The reasons for this fact are, first, the bolt D cannot turn to any hurtful extent on account of the ledge H on the fish-plate C; second, the nut-lock A' cannot turn any more than the head J of the bolt D on account of the ledge H' on the fish-plate C'; third, the nut E cannot turn back to a hurtful degree without subjecting the nut-lock A' to an increased tension, due to the striking and depressing of the lip G of the nut-lock A' by the corners of the nut E.

The lip G of the nut-lock A' is made, as shown, at such a distance from the center of the nut-lock and of such a depth and form that when any one of the sides of the nut E are parallel, or nearly so, with that portion of the lip G that faces toward the nut E, leaving sufficient space for clearance only between them, the bearing-surfaces of the nut-lock A' will be parallel, or nearly so, and at each whole turn of the nut E its corners will ride over and depress the lip G, and consequently increase the tension of the nut-lock A' four times, and whenever the corners of the nut E pass over and depress the nut-lock A' the bearing-surfaces of the nut-lock A' are thrown out of their parallel position. The sides of the lip G over which the corners of the nut E ride are made of such a form as will give but little more resistance to the rotary action of the nut E than is required to overcome the friction due to the tension of the nut-lock A'.

What I claim, and desire to secure by Letters Patent, is—

1. A nut-lock consisting of a spring made of one piece, having two or more folds, and having the lip G, substantially as and for the purposes set forth.

2. A nut-lock consisting of a spring made of one piece, having two or more folds so made and folded that its bearing-surfaces lie in parallel planes, or nearly so, and having one or more of its folds made in such a manner, having a straight portion on one side, as would prevent the nut-lock from turning by the striking of the straight portion against a ledge or stop when in use, substantially as described, and for the purposes set forth.

3. A nut-lock consisting of a spring made of one piece, having two or more folds so made and folded that its bearing-surfaces lie in parallel planes, or nearly so, and having one or more of its folds made in such a manner, having a straight portion on one side, as would prevent the nut-lock from turning by the striking of the straight portion against a ledge or stop when in use, in combination with the lip G, substantially as described, and for the purposes set forth.

4. A nut-lock consisting of a spring made of one piece, having two or more folds, and having the lip G, and provided with a straight portion to prevent rotation, in combination with the rail B, the fish-plates C and C', the ledges H and H', the bolt D, head J, and nut E, substantially as and for the purposes set forth.

In testimony whereof I have signed my name to this specification, in the presence of two subscribing witnesses, on this 9th day of February, A. D. 1886.

DANIEL ALLEY JOHNSON.

Witnesses:
  WALTER L. PERRY,
  GEO. H. PAXON.